Patented July 24, 1951

2,561,326

UNITED STATES PATENT OFFICE 2,561,326

SYNTHESIS OF dl-SPARTEINE

Nelson J. Leonard, Urbana, Ill.

No Drawing. Application March 22, 1949,
Serial No. 82,903

4 Claims. (Cl. 260—293)

My invention relates to dl-sparteine and more particularly to the synthesis thereof.

Sparteine, otherwise known as lupinidine, has in the past been obtained by the application of extractive processes to plant sources such as *Spartium scoparium* L., and *Anagyris foetida* L. A conveniently applicable synthesis of the drug is desirable since the extractive processes are inefficient, time-consuming and laborious, but hitherto all attempts at synthesis have been unsuccessful.

I have discovered that the synthesis of dl-sparteine is readily accomplished in good yield by reduction or reductive ring closure of a pyridine compound such as 2,4-bis-($\alpha$-pyridyl)-glutaric ester, 4-keto-3-($\alpha$-pyridyl)-pyridocoline-1-carboxylic acid esters, 4-keto-3-($\alpha$-piperidyl)-octahydropyridocoline-1-carboxylic acid ester, 2,4-bis-($\alpha$-piperdyl)-glutaric ester, dioxosparteine, and oxosparteine.

The above listed compounds, which for purposes of convenience are herein called pyridine compounds and which serve as starting materials for my synthesis of dl-sparteine, are known to the art and adequate directions for their production are to be found in the following publications: Clemo, Morgan and Raper, J. Chem. Soc., 1025 (1936); and Šorm and Keil, Collection of Czechoslov. Chem. Communs., 12, 655 (1947).

For the purpose of convenience, the chemical formulas of the compounds which serve as starting materials for my synthesis of dl-sparteine are given below. In the formulas R represents in each case an esterifying radical, such as for example, a lower alkyl group.

2,4-bis-($\alpha$-pyridyl)-glutaric ester

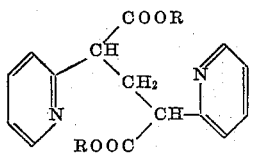

4-keto-3-($\alpha$-pyridyl)-pyridocoline-1-carboxylic acid ester

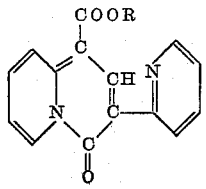

4-keto-3-($\alpha$-piperidyl)-octahydropyridocoline-1-carboxylic acid ester.

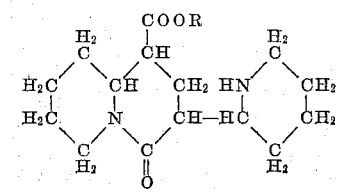

2,4-bis-($\alpha$-piperidyl)-glutaric ester

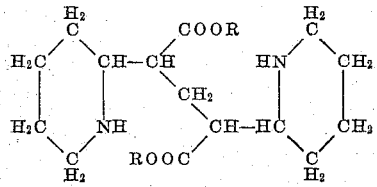

Dioxosparteine

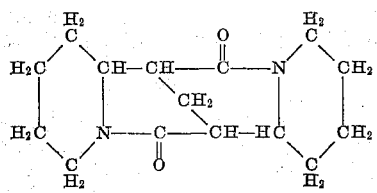

Oxosparteine

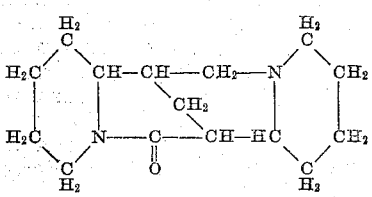

The hydrogenation desirably is carried out in a liquid dispersing medium to aid in promoting an intimate contact of the catalyst with the substance being hydrogenated. The dispersing medium can be a solvent or simply a suspending agent. Illustrative examples of suitable dispersing media are the higher boiling ethers, dioxane, ethanol, methylcyclohexane, and the like. The medium employed is of course one which is unaffected by the hydrogen and the catalyst, and many suitable media will readily be apparent to one skilled in the art.

The temperature and pressure at which the hydrogenation is carried out are critical so far as their lower limits are concerned. I have found that a temperature of approximately 200° C. and a pressure of about 200 atmospheres are required, but I prefer to employ a temperature of about 250° C. and a pressure of about 400 atmospheres. It will be appreciated, of course, that higher temperatures and pressures are operative, for example, temperatures and pressures somewhat in excess of 300° C. and 450 atmospheres respectively can be employed. The choice of a dispersing medium depends in part upon the temperature employed, since, as is known, the dispersing medium employed must not have a critical temperature lower than the temperature at which the reaction is carried out. At temperatures and pressures of the order of those indicated above, the hydrogenation of the pyridine compound with the formation of dl-sparteine is complete within a period of about one half to about three hours.

The catalyst I employ for my reaction is a mixed oxide catalyst of the class of the copper and zinc chromium oxide catalysts. Catalysts of this class are well known to the art and are commonly referred to as copper chromite or zinc chromite catalysts. Because of its more ready availability, I prefer to use copper chromite catalyst.

The dl-sparteine which is produced by hydrogenating one of the above-mentioned pyridine compounds is isolated from the reaction mixture in any suitable manner. Preferably, the dl-sparteine is isolated by filtering the reaction mixture to remove the catalyst, evaporating the solvent or dispersing agent, and distilling the residue. The dl-sparteine is obtained from the residue as a fraction boiling between about 120 and 126° C. at a pressure of about 1.25 mm. of mercury. The dl-sparteine so produced can be converted to its salts by known methods, and resolved into its optical enantiomorphs by the customary methods.

My invention is further illustrated by the following specific examples which describe suitable methods for the production of dl-sparteine from the pyridine compounds mentioned above.

Example 1

To a solution of 23.6 g. of 1-carbethoxy-4-keto-3-($\alpha$-pyridyl)-pyridocoline in 100 ml. of sodium-treated dioxane are added 20 g. of copper chromite catalyst. The mixture is placed in a hydrogenation bomb and hydrogen admitted at about 240 atmospheres pressure. The bomb is shaken and heated to effect hydrogenation. The maximum temperature and pressure attained during the course of the hydrogenation are respectively about 250° C. and 340 atmospheres. The hydrogenation is complete after about 3.5 hours. The bomb contents are filtered to remove the catalyst and the dioxane evaporated in vacuo, leaving a residual faintly yellow oil which contains the dl-sparteine. The oil is distilled and the fraction boiling at about 120–126° C. at a pressure of about 1.25 mm. of mercury is collected. This fraction comprises substantially pure dl-sparteine.

From the dl-sparteine obtained as above, the monopicrate and the dipicrate salts, melting respectively at 136–137° C. and 208° C., were prepared. Analysis of the di-sparteine monopicrate salt showed the presence of 54.55 percent carbon, 6.49 percent hydrogen, and 15.18 percent nitrogen as compared with the calculated values of 54.42 percent carbon, 6.31 percent hydrogen, and 15.11 percent nitrogen. Analysis of the dl-sparteine dipicrate salt showed the presence of 46.76 percent carbon, 4.88 percent hydrogen, and 16.28 percent nitrogen as compared with the calculated values of 46.82 percent carbon, 4.66 percent hydrogen, and 16.18 percent nitrogen. The yield of dl-sparteine obtained in accordance with the above procedure was about 50 percent of theory.

Example 2

50 g. of ethyl 2,4-bis-($\alpha$-pyridyl)-glutarate are dissolved in sufficient sodium-treated dioxane to make 500 ml. of solution, and 45 g. of copper chromite catalyst are added. The mixture is hydrogenated according to the procedure described in Example 1. The initial hydrogen pressure is about 200 atmospheres and this pressure increases during the course of the hydrogenation to a maximum pressure of about 300 atmospheres when the temperature is increased to about 265° C. The reaction mixture is filtered to remove the catalyst, the dioxane is evaporated in vacuo, and the residual oil containing the dl-sparteine is distilled. The fraction boiling at about 98–115° C. at a pressure of 0.1 mm. of mercury is collected.

The distillate is dissolved in about 600 ml. of hexane and chromatographed on an aluminum oxide column. The column is eluted with about 600 ml. of benzene. The benzene eluate is evaporated to dryness in vacuo and the residue comprising dl-sparteine is purified by distillation in vacuo. It boils at 123–124° C. at a pressure of about 1.25 mm. of mercury.

Example 3

15 g. of ethyl 2,4-bis-($\alpha$-piperidyl)-glutarate are dissolved in a sufficient amount of methylcyclohexane to make 100 ml. of solution, and 15 g. of zinc chromite catalyst are added. The mixture is hydrogenated at a temperature of 225° C. and a maximum pressure of about 250 atmospheres. The hydrogenation is complete in about one hour. The dl-sparteine is recovered by filtering the reaction mixture, evaporating the methylcyclohexane, and distilling the residual oil which contains the dl-sparteine. The principal distillation fraction containing the dl-sparteine boils at about 115–120° C. at a pressure of about 0.5 mm. of mercury.

Example 4

A solution of 24.8 g. of oxosparteine and 85 ml. of absolute ethanol is hydrogenated with copper chromite and hydrogen at a maximum temperature of about 215° C. and a pressure of about 400 atmospheres. The hydrogenation is complete in about 30 minutes. From the reaction mixture the sparteine is recovered according to the procedure described in the preceding examples.

Example 5

26.2 g. of dioxosparteine are dissolved in 80 ml. of sodium-treated dioxane and hydrogenated with copper chromite and hydrogen according to the procedure described in Example 1. The dl-sparteine obtained by the hydrogenation is isolated by filtering the hydrogenated reaction mixture to remove the catalyst, evaporating the dioxane used as the dispersing medium and distilling the residual oil which contains the dl-sparteine.

Example 6 dl-Sparteine is obtained from methyl 4-keto-3-($\alpha$-piperidyl)-octahydropyridocoline-1-carboxylate according to the procedure described in Example 3.

I claim:

1. The method of obtaining dl-sparteine which comprises hydrogenating at a temperature between about 200° C. and 300° C., and a pressure of at least 200 atmospheres with a catalyst of the class consisting of copper chromite and zinc chromite, a member of the group consisting of 4-keto-3-(α-pyridyl)-pyridocoline-1-carboxylic acid ester and 4-keto-3-(α-piperidyl)-octahydropyridocoline-1-carboxylic acid ester, and isolating the dl-sparteine which is formed.

2. The method of preparing dl-sparteine which comprises providing a dispersion in an inert medium of a member of the group consisting of 4-keto-3-(α-pyridyl)-pyridocoline-1-carboxylic acid ester and 4-keto-3(α-piperidyl)-octahydropyridocoline-1-carboxylic acid ester, subjecting said dispersion at a temperature between about 200° C. and 300° C., and a pressure of at least 200 atmospheres to the action of hydrogen and a catalyst of the class consisting of copper chromite and zinc chromite, and isolating the dl-sparteine.

3. The method of preparing dl-sparteine which comprises treating a dioxane solution of a lower alkyl ester of 4-keto-3-(α-pyridyl)-pyridocoline-1-carboxylic acid at a temperature of about 250° C. and a pressure of about 400 atmospheres with hydrogen and copper chromite catalyst, and isolating the dl-sparteine.

4. The method of preparing dl-sparteine which comprises treating a dioxane solution of a lower alkyl ester of 4-keto-3-(α-piperidyl)-octahydropyridocoline-1-carboxylic acid at a temperature of about 250° C. and a pressure of about 400 atmospheres with hydrogen and copper chromite catalyst, and isolating the dl-sparteine.

NELSON J. LEONARD.

REFERENCES CITED

The following references are of record in the file of this patent:

UNITED STATES PATENTS

| Number | Name | Date |
|---|---|---|
| 2,470,108 | Pati et al. | May 17, 1949 |

OTHER REFERENCES

Clemo et al.: Jour. Chem. Soc. (London), 1936, pp. 1025–1028.

Henry: The Plant Alkaloids (4th ed.), The Blackiston Co., Phila., 1949, p. 138.